United States Patent
Numaguchi et al.

(10) Patent No.: US 6,939,820 B2
(45) Date of Patent: Sep. 6, 2005

(54) ANTIBACTERIAL GLASS COMPOSITION AND ANTIBACTERIAL POLYMER COMPOSITION USING THE SAME

(75) Inventors: Minoru Numaguchi, Nagoya (JP); Makio Nomura, Nagoya (JP)

(73) Assignee: Ishisuka Garasu Kabushiki Kaisha, Aichi (JP)

( * ) Notice: Subject to any disclaimer, the term of this patent is extended or adjusted under 35 U.S.C. 154(b) by 54 days.

(21) Appl. No.: 10/721,365

(22) Filed: Nov. 26, 2003

(65) Prior Publication Data

US 2004/0170700 A1 Sep. 2, 2004

(30) Foreign Application Priority Data

Feb. 28, 2003 (JP) .................................. 2003-054716

(51) Int. Cl.[7] .......................... C03C 3/16; A01N 59/00
(52) U.S. Cl. .......................... 501/45; 424/604; 424/618
(58) Field of Search .......................... 501/45; 424/601, 424/602, 611, 610, 641, 618

(56) References Cited

U.S. PATENT DOCUMENTS 6,593,260 B2 * 7/2003 Nomura ........................ 501/48

FOREIGN PATENT DOCUMENTS

| EP | 1 116 700 A | 7/2001 |
|---|---|---|
| JP | 7300339 | 11/1995 |
| JP | 8012512 | 1/1996 |
| JP | 8048539 | 2/1996 |
| JP | 2000327364 A * | 11/2000 ............. C03C/4/00 |
| JP | 2001-247336 | 9/2001 |

OTHER PUBLICATIONS

Patent Abstracts of Japan, vol. 1996, No. 06, Jun. 28, 1996 & JP 8–048539A, Nippon Sheet Glass Co., Ltd.
Patent Abstracts of Japan, vol. 0171, No. 85, Apr. 12, 1993 & JP 4 338129 A, Ishizuka glass Co. Ltd.
Patent Abstracts of Japan, vol. 2000, No. 10, Nov. 17, 2000 & JP 2000 191339 A Koa Glass KK.
Patent Abstracts of Japan, vol. 1996, No. 3, Mar. 29, 1996 & JP 7 300339 A, Nippon Sheet Glass Co., Ltd.

* cited by examiner

*Primary Examiner*—David Sample
(74) *Attorney, Agent, or Firm*—Townsend & Banta

(57) ABSTRACT

The present invention provides an antibacterial glass composition exhibiting high antibacterial performance with sufficiently sustaining antibacterial performance by adding a small amount of the antibacterial component, and an antibacterial polymer composition using the antibacterial glass composition. The present invention provides an antibacterial glass composition containing 0.1 to 5.0% by weight of $Ag_2O$ in a glass composition containing 30 to 60 mol % of $P_2O_5$, 1 to 15 mol % of one or more compounds selected from the group consisting of $K_2O$, $Na_2O$ and $Li_2O$, 35 to 55 mol % of one or more compounds selected from the group consisting of MgO, CaO and ZnO, and 0.01 to 3 mol % of one or more compounds selected from the group consisting of $La_2O_3$ and $Y_2O_3$.

6 Claims, No Drawings

US 6,939,820 B2

ANTIBACTERIAL GLASS COMPOSITION AND ANTIBACTERIAL POLYMER COMPOSITION USING THE SAME

BACKGROUND OF THE INVENTION

1. Field of the Invention

The present invention relates to an antibacterial glass composition and an antibacterial polymer composition using the same.

2. Description of the Related Art

Antibacterial resin products using inorganic antibacterial agents such as zirconium phosphate, silver zeolite and soluble glass in which silver is retained have been widely used for home appliances used in bathrooms, lavatories and kitchens.

The soluble glass is a generic name of a glass in which the composition of the glass has been adjusted so as to exhibit a controlled rate of solution considering physical and chemical properties of the glass. It is known in the art that the glass containing elements such as silver, copper and zinc compounds having an antibacterial function can discharge the silver, copper and zinc ions at a given speed for an arbitrary period of several hours to several years. The discharged silver, copper and zinc ions are adsorbed on cell walls of bacteria and other microorganisms, or concentrated into the cells to exhibit antibacterial actions by inhibiting growth of the bacteria and microorganisms by a so-called oligodynamic effect. This soluble glass has been used in the entire field using antibacterial agents, and is formed into composites with synthetic resins and textiles. Various methods developed for forming the composite comprise producing final products by kneading the antibacterial soluble glass into raw materials before molding, and adhering the antibacterial soluble glass on the products as post-processing.

Such soluble glasses known in the art include borosilicate glasses mainly comprising $SiO_2$ and $B_2O_3$, and phosphate glasses mainly comprising $P_2O_5$. Particularly, the soluble phosphate glasses are widely used since silver, copper and zinc ions are quite stable in the glass and the glass can contain a large quantity of these ions. For example, Japanese Patent Application Laid-Open (JP-A) Nos. H07-300339, 08-012512 and 08-048539, and Japanese Patent Publication Laid-Open No. 2001-247336 disclose the antibacterial agents using the soluble phosphate glasses containing silver ions ($Ag^+$ ions). Japanese Patent Publication Laid-Open No. 2001-247336 particularly discloses antibacterial polymer compositions prepared by forming a composite of an antibacterial glass composition with a polymer material.

However, antibacterial effects are hardly exhibited in the products obtained by adding the above antibacterial agent in the polymer materials or polymer materials containing inorganic fillers (for example, materials used for artificial marble), although the reason thereof is not clear. Accordingly, a lot of the antibacterial component should be added in such products. However, increasing the amount of addition causes high production costs while readily arising color changes due to metal ions such as the silver ions in the inorganic antibacterial agent, thereby damaging the external appearance of the product.

Accordingly, the object of the present invention is to provide an antibacterial glass composition that provides high antibacterial performance and sufficient durability of the performance even when a small amount of antibacterial components are added, and to provide an antibacterial polymer composition using the antibacterial glass composition.

SUMMARY OF THE INVENTION

The present invention for solving the problems above provides an antibacterial glass composition containing 0.1 to 5.0% by weight of $Ag_2O$ in a glass composition containing 30 to 60 mol % of $P_2O_5$, 1 to 15 mol % of one or more compounds selected from the group consisting of $K_2O$, $Na_2O$ and $Li_2O$, 35 to 55 mol % of one or more compounds selected from the group consisting of MgO, CaO and ZnO, and 0.01 to 3 mol % of one or more compounds selected from the group consisting of $La_2O_3$ and $Y_2O_3$.

The glass composition having the constitution as described above is usually a soluble glass. $Ag^+$ ions contained in the antibacterial glass composition (soluble glass) are discharged from the glass for an arbitrary period of time at a prescribed dissolution speed, and materials as objects for giving the antibacterial function such as resins is able to be endowed with a high antibacterial function by the $Ag^+$ ions.

The inventors of the present invention have ascertained, through intensive studies, that the cause of failing in obtaining the antibacterial effect when the glass composition is added in the polymer material, or more specifically in the polymer material containing the inorganic filler (for example the material used for artificial marble) is ascribed to $Al_2O_3$ used as a component for enhancing water resistance of the glass. Although the reason has not been made clear yet, it may be conjectured that discharge of the $Ag^+$ ions is blocked since $Ag^+$ ions in the soluble glass are trapped by $Al_2O_3$.

Accordingly, in the present invention, one or more compounds selected from the group consisting of $La_2O_3$ and $Y_2O_3$ are added as components for improving water resistance in the antibacterial glass composition in place of $Al_2O_3$. This enables the antibacterial glass composition having high and sufficiently sustained antibacterial performance to be obtained even by adding a small amount of the antibacterial component while maintaining the same degree of water resistance of the soluble glass as that of the conventional soluble glass. The proportion of $La_2O_3$ and $Y_2O_3$ in the soluble glass is 0.01 to 3 mol %. A proportion of less than 0.01 mol % may fail in obtaining sufficient water resistance of the glass, while a proportion of exceeding 3 mol % increases water resistance of the glass excessively, and the antibacterial effect cannot be obtained by adding a small amount of the soluble glass to result in a high production cost. The proportion is preferably 0.1 to 2.5 mol %, more preferably 0.5 to 2.0 mol %.

The crucial meaning of other components contained in the antibacterial glass composition will be described below.

$P_2O_5$ is a principal component of the glass composition (soluble glass). A proportion of $P_2O_5$ of less than 30 mol % makes vitrification difficult. When the proportion exceeds 60 mol %, on the other hand, water resistance of the glass composition remarkably decreases, or the glass composition becomes so hygroscopic in the pulverizing process for forming a composite between the antibacterial glass composition and a material as an object for giving an antibacterial function such as a resin that pulverization becomes impossible due to secondary aggregation. Therefore, the proportion of $P_2O_5$ is preferably 35 to 55 mol %, more preferably 40 to 51 mol %.

One or more compounds selected from the group consisting of $K_2O$, $Na_2O$ and $Li_2O$ are the components that facilitate vitrification of the glass composition (soluble glass). However, vitrification may be difficult at a content of these compounds of less than 1 mol %. When the content exceeds 15 mol %, on the other hand, the glass may be colored by silver, and the rate of solution of the glass composition (soluble glass) in water is so increased that the antibacterial function sustaining effect may be decreased. The content is preferably 1 to 12 mol %, more preferably 2 to 8 mol %.

One or more compounds selected from the group consisting of MgO, CaO and ZnO are compounds that serve for improving water resistance of the glass composition (soluble glass). A sufficient water resistance cannot be obtained at a content of less than 35 mol %, and the effect for sustaining the antibacterial function may be decreased due to too high rate of solution of the soluble glass. When the content exceeds 55 mol %, on the other hand, vitrification becomes difficult, and dissolution speed of the soluble glass becomes so slow that the antibacterial effect cannot be expected at a small amount of addition of the antibacterial glass composition. The preferable amount is 40 to 55 mol %, more preferably 40 to 49 mol %.

$Ag_2O$ is a principal component that exhibits the antibacterial action. A content of the compound of less than 0.1% by weight may fail in giving an antibacterial function to an object to be endowed with the antibacterial function by adding a small amount of the antibacterial glass composition. The antibacterial material (an antibacterial product obtained by forming a composite with the glass composition) may be colored at an amount of addition of more than 5.0% by weight. Accordingly, the preferable amount of addition is 1.0 to 5.0% by weight, more preferably 1.3 to 4.5% by weight. While Ag ions having a wide antibacterial spectrum are preferable as the component that exhibits the antibacterial function, copper ions and zinc ions are also available, and a copper compound or a zinc compound may be added.

In the antibacterial polymer composition of the present invention, a polymer material is formed into a composite with the antibacterial glass composition in order to endow the polymer composition with an excellent antibacterial function. A thermoplastic resin or thermosetting resin may be favorably used as the polymer material. A molded product is easily obtained due to excellent moldability of the synthetic resin. The thermoplastic resins such as polypropylene, polyethylene and ABS resins are preferable since a molded product is easily obtained using these resins.

In the antibacterial polymer composition of the present invention, the antibacterial glass composition is formed into a composite with a polymer material containing an inorganic filler in order to give the excellent antibacterial function to the polymer composition. An acrylic resin or an unsaturated polyester resin that is used for a material of the artificial marble can be favorably used for the polymer material. Examples of the inorganic filler added in the polymer material include calcium carbonate, aluminum hydroxide, magnesium hydroxide, talk, kaolin, sepiolite, montmorillonite, tourmaline, glass fiber, glass beads, glass flake, mica, silica, titanium oxide, barium sulfate, alumina, zinc oxide and hydrotalcite.

Furthermore, it was made clear that the preferable amount of discharge of silver and/or zinc from the antibacterial polymer composition is in the range as follows. One milliliter of distilled water is dripped on the surface of the polymer material in which the antibacterial component is added, a polyethylene film with an area of 4×4 cm is laid on the polymer material, and the amount of discharge of silver in the solution is quantitatively assayed by inductively coupled plasma emission spectrometry after placing the polymer material for 24 hours in an incubator at 35° C. The amount of discharge of silver is in the range of 0.5 to 10 $ng/cm^2/day$, more preferably in the range of 1 to 6 $ng/cm^2/day$, and particularly in the range of 1 to 4 $ng/cm^2/day$ according to the antibacterial activity test by JIS Z 2801:2000. The ranges are restricted as described above because, when the amount of discharge is below the lower limit, antibacterial effect cannot be obtained while, when the amount of discharge exceeds the upper limit, external appearance of the material becomes poor due to color changes.

DESCRIPTION OF THE PREFERRED EMBODIMENT

The following experiments were carried out for confirming the effect of the present invention.

Mixed in respective composition ratios (mol %) shown in Tables 1 and 2 were $P_2O_5$, $K_2O$, $Na_2O$, $Li_2O$, MgO, CaO, ZnO, $La_2O_3$ and $Y_2O_3$, and $Ag_2O$ was mixed to the mixture above in each weight ratio (% by weight) as shown in Tables 1 and 2, then the mixture was melted at 1250 to 1350° C. for 1 hour in an electric furnace. The molten mixture was taken out of the furnace, and was drained onto a carbon plate to allow the mixture to leave still for cooling. The solidified mixture was pulverized thereafter using a rasher or ball mill so that mean particle diameter(s) of about 10 μm is obtained, thereby obtaining samples A to F (Table 1) of the present invention, and comparative samples G to J (Table 2) of the antibacterial glass composition.

Although the comparative samples G to J do not have the compositions according to the claim 1 of the present invention, each of them will be described in detail. The proportion of the sum of $La_2O_3$ and $Y_2O_3$ in the comparative sample G do not fall within the scope of the present invention. The proportion of $Ag_2O$ in the comparative sample H does not fall within the scope of the present invention. The proportion of the sum of MgO, CaO and ZnO in the comparative sample I do not fall within the scope of the present invention. The comparative example J was omitted since the proportion of $P_2O_5$ and the proportion of the sum of MgO and CaO in the comparative sample J do not fall within the scope of the present invention, and the sample cannot be vitrified.

TABLE 1

|  | A | B | C | D | E | F |
|---|---|---|---|---|---|---|
| $P_2O_5$ (mol %) | 45 | 49.7 | 40 | 49 | 45 | 49 |
| $Li_2O$ (mol %) |  |  |  |  | 3 |  |
| $Na_2O$ (mol %) |  | 3 | 3 |  | 5 |  |
| $K_2O$ (mol %) | 6 |  | 6 | 6 |  | 3 |
| MgO (mol %) | 38 | 47 | 35.9 | 38.7 | 34 |  |
| CaO (mol %) | 10 |  | 15 | 6 | 10 | 6 |
| ZnO (mol %) |  |  |  |  | 2 | 40 |
| $La_2O_3$ (mol %) | 1 | 0.3 |  | 0.3 |  | 2 |
| $Y_2O_3$ (mol %) |  |  | 0.1 |  | 1 |  |
| $Ag_2O$ (% by weight) | 1.0 | 2.5 | 3.5 | 2.5 | 4.0 | 2.0 |

TABLE 2

|  | G | H | I | J |
|---|---|---|---|---|
| $P_2O_5$ (mol %) | 54 | 50 | 54 | 25 |
| $Li_2O$ (mol %) |  |  |  |  |
| $Na_2O$ (mol %) |  | 13 | 15 | 14.9 |
| $K_2O$ (mol %) | 1 |  |  |  |
| MgO (mol %) | 30 | 30 | 30 | 30 |
| CaO (mol %) | 15 | 3 |  | 30 |

TABLE 2-continued

|  | G | H | I | J |
|---|---|---|---|---|
| ZnO (mol %) |  | 3 |  |  |
| La$_2$O$_3$ (mol %) |  | 1 |  | 0.1 |
| Y$_2$O$_3$ (mol %) |  |  | 1 |  |
| Ag$_2$O (% by weight) | 3.0 | 5.5 | 2.0 | 3.5 |

Each sample A to I shown in Tables 1 and 2 was mixed with the polypropylene resin in a proportion shown in Table 3. Antibacterial function test samples were prepared thereafter using an injection molder, and samples shown in Examples 1 to 6 and Comparative Examples 1 to 3 in Table 3 were obtained. Each sample A to I shown in Tables 1 and 2 and calcium carbonate as an inorganic filler were added to an unsaturated polyester resin to prepare the antibacterial effect test samples in Examples 7 to 12 and Comparative Examples 4 to 6 shown in Table 4. The size of each sample was 100 mm in length, 50 mm in width and 2 mm in thickness.

The antibacterial functions of each sample in the examples and comparative examples were evaluated. The results are shown in Tables 3 and 4. The antibacterial function was tested according to JIS Z 2801:2000. Actually, one milliliter of distilled water is dripped on the surface of the polymer material in which the antibacterial component is added, a polyethylene film with an area of 4×4 cm is laid on the material, and the amount of discharge of silver in the solution is quantitatively assayed by inductively coupled plasma emission spectrometry after placing the polymer material for 24 hours in an incubator at 35° C. The antibacterial properties evaluated according to JIS Z 2801:2000 are shown in Tables 3 and 4 as ○ when the antibacterial activity is 2.0 or more, and as x when the antibacterial activity is less than 2.0.

The samples were subjected to pre-treatments based on the sustained antibacterial power test method (edited in 2001) by the Antibacterial Product Technology Conference. The polypropylene test samples (Examples 1 to 6 and Comparative Examples 1 to 3) were subjected to rank 2 water resistance treatment (16 hours' immersion in warm water at 50° C.), and the unsaturated polyester test samples (Examples 7 to 12 and Comparative Examples 4 to 6) were subjected to rank 3 water resistance treatment (16 hours' immersion in warm water at 90° C.).

TABLE 3

|  | EXAMPLE | | | | | | COMPARATIVE EXAMPLE | | |
|---|---|---|---|---|---|---|---|---|---|
|  | 1 | 2 | 3 | 4 | 5 | 6 | 1 | 2 | 3 |
| COMPOSITION OF GLASS | A | B | C | D | E | F | G | H | I |
| AMOUNT OF ADDITION IN RESIN (%) | 0.4 | 0.2 | 0.2 | 0.2 | 0.2 | 0.3 | 0.3 | 0.6 | 0.2 |
| DISCHARGE RATE OF SILVER (ng/cm$^2$/day) | 4.0 | 3.2 | 1.3 | 2.1 | 0.9 | 2.2 | 6.3 | 12.0 | 4.4 |
| INITIAL ANTIBACTERIAL EFFECT (*Escherichia coli*) | ○ | ○ | ○ | ○ | ○ | ○ | ○ | ○ | ○ |
| INITIAL ANTIBACTERIAL EFFECT (*Staphylococcus aureus*) | ○ | ○ | ○ | ○ | ○ | ○ | ○ | ○ | ○ |
| ANTIBACTERIAL EFFECT AFTER SUSTAINING TREATMENT (*Escherichia coli*) | ○ | ○ | ○ | ○ | ○ | ○ | X | ○ | X |
| ANTIBACTERIAL EFFECT AFTER SUSTAINING TREATMENT (*Staphylococcus aureus*) | ○ | ○ | ○ | ○ | ○ | ○ | X | ○ | X |

TABLE 4

|  | EXAMPLE | | | | | | COMPARATIVE EXAMPLE | | |
|---|---|---|---|---|---|---|---|---|---|
|  | 7 | 8 | 9 | 10 | 11 | 12 | 4 | 5 | 6 |
| COMPOSITION OF GLASS | A | B | C | D | E | F | G | H | I |
| AMOUNT OF ADDITION IN RESIN (%) | 0.5 | 0.2 | 0.2 | 0.2 | 0.2 | 0.3 | 0.3 | 0.6 | 0.2 |
| DISCHARGE RATE OF SILVER (ng/cm$^2$/day) | 6.3 | 2.7 | 2.1 | 3.0 | 0.7 | 4.1 | 6.5 | 15.1 | 5.8 |
| INITIAL ANTIBACTERIAL EFFECT (*Escherichia coli*) | ○ | ○ | ○ | ○ | ○ | ○ | ○ | ○ | ○ |
| INITIAL ANTIBACTERIAL EFFECT (*Staphylococcus aureus*) | ○ | ○ | ○ | ○ | ○ | ○ | ○ | ○ | ○ |
| ANTIBACTERIAL EFFECT AFTER SUSTAINING TREATMENT (*Escherichia coli*) | ○ | ○ | ○ | ○ | ○ | ○ | X | ○ | X |
| ANTIBACTERIAL EFFECT AFTER SUSTAINING TREATMENT (*Staphylococcus aureus*) | ○ | ○ | ○ | ○ | ○ | ○ | X | ○ | X |

According to the results of evaluations above, the samples in Examples 1 to 12 showed good results with respect to the initial antibacterial functions as well as the initial antibacterial functions after the sustaining treatment. On the contrary, the samples in Comparative Examples 1 to 6 showed poor results with respect to any of the test items. The results of evaluation of each sample will be described below. With respect to Comparative Examples 1 and 4, a sufficient sustaining effect seems not to be obtained since $La_2O_3$ and $Y_2O_3$ as the glass compositions were not contained in the comparative sample G. With respect to Comparative Examples 2 and 5, the color of the composition was changed since the content of $Ag_2O$ in the comparative sample H was large. The samples in Comparative Examples 3 and 6 seem to fail in obtaining sufficient sustaining effects since the content of MgO as the glass composition was small in the comparative sample I. Consequently, the samples in the examples corresponding to the claims of the present invention were found to have excellent light stability of colors, initial antibacterial function and antibacterial function after the sustaining treatment.

It is apparent from the results above that the antibacterial glass composition of the present invention and antibacterial polymer composition using the glass composition can exhibit high antibacterial performance with sufficiently sustaining antibacterial performance by adding even a small amount of the antibacterial component, since the content of the components constituting the glass is within the scope of the present invention.

What is claimed is:

1. An antibacterial glass composition containing 0.1 to 5.0% by weight of $Ag_2O$ in a glass composition containing 30 to 60 mol % of $P_2O_5$, 1 to 15 mol % of one or more compounds selected from the group consisting of $K_2O$, $Na_2O$ and $Li_2O$, 35 to 55 mol % of one or more compounds selected from the group consisting of MgO, CaO and ZnO, and 0.01 to 3 mol % of one or more compounds selected from the group consisting of $La_2O_3$ and $Y_2O_3$.

2. An antibacterial polymer composition prepared by forming a composite of a polymer material with the antibacterial glass composition according to claim 1.

3. The antibacterial polymer composition according to claim 2, wherein the polymer material is a synthetic resin material comprising a thermoplastic resin or a thermosetting resin.

4. The antibacterial polymer composition according to claim 3, wherein the thermoplastic resin is any one of polypropylene, polyethylene and ABS.

5. An antibacterial polymer composition prepared by forming a composite of a polymer material containing an inorganic filler with the antibacterial glass composition according to claim 1.

6. The antibacterial polymer composition according to claim 5, wherein the polymer composition containing the inorganic filler is an acrylic resin or an unsaturated polyester resin.

* * * * *